US012158038B2

(12) United States Patent
Schettine

(10) Patent No.: US 12,158,038 B2
(45) Date of Patent: Dec. 3, 2024

(54) METHODS OF MAKING INTERFACE STRIPS FOR STRUCTURAL FRAMING

(71) Applicant: Michael Schettine, Delanson, NY (US)

(72) Inventor: Michael Schettine, Delanson, NY (US)

( * ) Notice: Subject to any disclaimer, the term of this patent is extended or adjusted under 35 U.S.C. 154(b) by 687 days.

(21) Appl. No.: 17/354,706

(22) Filed: Jun. 22, 2021

(65) Prior Publication Data

US 2021/0310297 A1 Oct. 7, 2021

Related U.S. Application Data

(63) Continuation-in-part of application No. 16/563,790, filed on Sep. 6, 2019, now Pat. No. 11,041,304.

(60) Provisional application No. 62/728,071, filed on Sep. 6, 2018.

(51) Int. Cl.
*G06F 30/20* (2020.01)
*E06B 1/62* (2006.01)

(52) U.S. Cl.
CPC .......... *E06B 1/62* (2013.01); *E06B 2001/628* (2013.01)

(58) Field of Classification Search
CPC ...... E06B 1/62; E06B 2001/628; G06F 30/20; G06F 30/10
USPC .............................................................. 703/1
See application file for complete search history.

(56) References Cited

U.S. PATENT DOCUMENTS 2,187,087 A 1/1940 Leary
2,704,868 A 3/1955 Danielson
3,628,232 A 12/1971 Brewer
3,785,060 A 1/1974 Brewer
3,816,931 A 6/1974 LaMar
4,367,590 A 1/1983 Winter
4,845,858 A 7/1989 Thomas
5,012,590 A 5/1991 Wagner
5,195,249 A 3/1993 Jackson
5,627,763 A 5/1997 Carlson
5,640,812 A 6/1997 Crowley
5,724,246 A 3/1998 Heil
(Continued)

OTHER PUBLICATIONS

Angdon, Geoffrey Moore. "AutoCAD Architectural Desktop." Cadence Channel: Feature Review AutoCAD Architectural Desktop. Oct. 1998.

(Continued)

*Primary Examiner* — Andre Pierre-Louis
(74) *Attorney, Agent, or Firm* — Heslin, Rothenberg, Farley & Mesiti P.C.

(57) ABSTRACT

Interface strips and methods of making interface strips for structural framing are disclosed. The interface strips comprise at least one thin, elongate pliable and malleable layer, and at least one thin, elongate resilient and compressible outer layer extending over at least one face of the malleable layer. The at least one malleable layer is configured to maintain a three-dimensional shape of the interface strip, and at least one face of the interface strip includes a plurality of spaced visual framing location indications. The interface strip is configured to extend over first and second framing plates, and includes a cutting reference indication positioned at and extending along an interface of the first and second framing plates such that when cut, the interface strip forms first and second interface strip portions coupled to the first and second plates, respectively, each including at least a portion of the visual framing location indications.

20 Claims, 5 Drawing Sheets

(56) References Cited

U.S. PATENT DOCUMENTS

| | | | |
|---|---|---|---|
| 5,755,072 | A | 5/1998 | Lingafelter |
| 5,819,498 | A | 10/1998 | Geraci |
| 5,953,826 | A | 9/1999 | Goodyer |
| 6,230,466 | B1 | 5/2001 | Pryor |
| 6,360,448 | B1 | 3/2002 | Smyj |
| 6,401,401 | B1 | 6/2002 | Williams |
| 6,546,679 | B1 | 4/2003 | Bushberger |
| 6,766,282 | B1 | 7/2004 | Schettine |
| 7,373,731 | B2 | 5/2008 | Nyberg |
| 7,444,270 | B2 | 10/2008 | Schettine |
| 7,533,473 | B2 | 5/2009 | Chua |
| 7,603,816 | B1 | 10/2009 | Hohmann |
| 7,644,510 | B2 | 1/2010 | Gingerella |
| 8,225,521 | B1 | 7/2012 | Mooney |
| 8,720,129 | B2 | 5/2014 | Sias |
| 8,826,600 | B2 * | 9/2014 | Wallance ............ E04B 1/34331 52/79.1 |
| 9,951,516 | B2 | 4/2018 | Millhouse |
| 2001/0034984 | A1 | 11/2001 | Murphy |
| 2005/0072099 | A1 | 4/2005 | Roesset |
| 2005/0108957 | A1 * | 5/2005 | Quesada ............. E04B 1/34869 52/143 |
| 2005/0204697 | A1 * | 9/2005 | Rue .......................... E04B 5/02 52/782.1 |
| 2006/0101726 | A1 | 5/2006 | Collins |
| 2008/0060295 | A1 | 3/2008 | Powanda |
| 2009/0107066 | A1 | 4/2009 | O'Leary |
| 2010/0058683 | A1 | 3/2010 | Bushberger |
| 2010/0122501 | A1 | 5/2010 | Thomas |
| 2010/0139178 | A1 | 6/2010 | Ehrman |
| 2011/0078967 | A1 | 4/2011 | Pacylowski |
| 2011/0225924 | A1 | 9/2011 | Carbonaro |
| 2011/0296768 | A1 | 12/2011 | Clearfield |
| 2012/0079788 | A1 | 4/2012 | Floren |
| 2014/0190099 | A1 | 7/2014 | Hopkins |
| 2014/0250801 | A1 | 9/2014 | Knollmeyer |
| 2015/0047269 | A1 | 2/2015 | Messenger |
| 2017/0284112 | A1 | 10/2017 | Elshani |
| 2018/0038121 | A1 | 2/2018 | Youngborg |
| 2020/0080296 | A1 | 3/2020 | Schettine |

OTHER PUBLICATIONS

Newton, C. Simulated Site Visits. A 4D Multimedia Database for the Study of Architectural Construction, 1999 IEEE International Conference on Information Visualization, pp. 62-66.

Boar, B.H. A Blueprint for Solving Problems in Your IT Architecture, IT Professional; vol. 1, Issue 6, Nov.-Dec. 1999, pp. 23-29.

Huang et al., M. Interpreting Images of Architectural Drawings for Building Cost Estimation, Sixth International Conference on Image Processing and Its Applications, vol. 1, 1997, pp. 126-130.

Dosch et al., P. Reconstruction of the 3D Structure of a Building form the 2D Drawings of its Floors, Proceedings of the Fifth International Conference on Document Analysis and Recognition, ICDAR '99, 1999, pp. 487-490.

Ding et al., C. A. Framework for the Automated Drawing of Data Structure Diagrams, IEEE Transactions on Software Engineering, vol. 16, No. 5, May 1990, pp. 543-557.

* cited by examiner

METHODS OF MAKING INTERFACE STRIPS FOR STRUCTURAL FRAMING

CROSS-REFERENCE TO RELATED APPLICATION

This application is a continuation-in-part of U.S. Non-Provisional application Ser. No. 16/563,790, filed on Sep. 6, 2019, and entitled Interface Strips for Structural Framing and related Framing Methods, which claims priority benefit to U.S. Provisional Patent Application No. 62/728,071, filed Sep. 6, 2018, and entitled Interface Strips for Improved Structural Framing, which are hereby expressly incorporated herein by reference in their entireties.

FIELD OF THE DISCLOSURE

The present invention generally relates to interface strips for increasing the structural performance of structural framing and related methods of manufacturing and using such interface strips. The invention also relates to articles comprising the insulation or filling, and to methods of making the insulation and/or filling material.

BACKGROUND

Generally, building construction includes framing. In platform framing, which is used for most building construction, the first floor is built on top of the foundation walls as though it were a platform. The floor provides a base upon which the carpenter can assemble wall sections and then raise them into place. The wall sections may support a platform for the second floor where the wall sections and partitions are again built and erected. Each floor is framed separately. The roof is framed above the upper-most walls.

Typically, a carpenter must read a building blueprint to determine the dimensions for each wall. The carpenter then uses a flexible measuring tape to make manual measurements of distances along a structural member such as a top or bottom plate of a wall. Markings are manually applied to the structural member to locate the positions of various members such as studs, jack posts, cripples, etc. Additionally, the locations for doors and windows must be manually marked.

The manual marking method is time consuming and requires a large number of measurements. The measurements may also require the assistance of another person. Measuring and marking errors may result in misplaced components such as doors or windows. These mistakes can result in costly construction delays involving reinstallation and rebuilding of structural elements.

Further, in structural framing, framing plates (e.g., top plates and bottom plates), sills, joists, sheathing and other framing members or components are typically secured (e.g., nailed or screwed) in direct contact. Such framing components are also typically wood, metal or a composite material with surfaces that include a particular coefficient of friction and joint space or profile when mated and secured (e.g., via nail pattern). Some relatively heavy loads applied to framed buildings or the like, such as relatively high wind loading, seismic loading or other stressors, can cause the structural framing components to move with respect to each other, and thereby potentially break or de-couple. For example, some relatively heavy loads can cause racking (misalignment of structural members from a true vertical position) of structural framing components.

Therefore, a need exists for apparatuses and related methods that enhance the structural performance of framing structures and simplify and speed up the manual construction process.

While certain aspects of conventional technologies have been discussed to facilitate disclosure of the invention, Applicant in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

Briefly, the present inventions satisfy the need for improved structural framing and framing processes. The present inventions may address one or more of the problems and deficiencies of the art discussed above. However, it is contemplated that the inventions may prove useful in addressing other problems and deficiencies in a number of technical areas. Therefore, the claimed inventions should not necessarily be construed as limited to addressing any of the particular problems or deficiencies discussed herein.

Certain embodiments of the presently-disclosed framing interface strips, and methods for forming and utilizing the framing interface strips, have several features, no single one of which is solely responsible for their desirable attributes. Without limiting the scope of the framing interface strips and related methods, as defined by the claims that follow, their more prominent features will now be discussed briefly. After considering this discussion, and particularly after reading the section of this specification entitled "Detailed Description," one will understand how the features of the various embodiments disclosed herein provide a number of advantages over the current state of the art.

In one aspect, the disclosure provides framing interface strips that enhance/increase the structural performance of framing structures in framed buildings, increase the coefficient of friction (COF) between plates, flooring, foundations, sills, sheathing and any other abutting framing components or members of framed buildings, and facilitate or provide for improved framing construction efficiency and accuracy, as compared to when the strips are not utilized.

In some embodiments, the framing interface strips may be elongate relatively thin (in thickness) strips formed of one or more layers of a soft, resilient, compressible and/or elastically deformable, durable interface material combined with one or more inner layers of a pliable malleable, ductile and/or plastically deformable mesh or other "open" material (i.e., a sheet or layer with a plurality of openings or through apertures extending along the thickness direction). The one or more layers of a resilient layers and one or more malleable mesh layers are stacked or overlie each other in the thickness direction, and the at least the one or more layers of a resilient layers (and potentially the one or more malleable mesh layers) extend entirely along the width and length directions (i.e., define the length and width dimensions of the strips). The one or more malleable mesh layers may be configured to resist stretching at least along the length direction to provide stability/rigidity to the interface strips as a whole along the length direction (e.g., to resist stretching when the strips are placed in tension along the length direction). In some embodiments, the framing interface strips may solid strips along the entirety of the strips. In some other embodiments, the framing interface strips may include one or more cuts or separations extending therethrough in the thickness direction that extend along the width direction from the outer lateral edges partially toward the middle of the strips along the width direction.

The framing interface strips are configured to be positioned/coupled between typically-abutting framing components of framing of a building, such as the interior surface of structural sheathing and a frame-face surface, for example. The framing interface strips are configured are configured to increased bond strength between the surfaces of the structural frame components coupled thereto (i.e., abutting/coupled to opposing sides of the strips, when installed) and/or increase stability against lateral racking of framing components, such as framed wall assemblies. The framing interface strips can increase the structural stability of the framing components, which may be particularly advantageous for buildings located in high wind zones, seismic regions and tornado prone areas, for example.

Additionally, at least one outer face of the strips (e.g., a face extending along the width and length directions, which may be defined or formed via the resilient layer(s)) may include visual framing location indications or markings 18 or indications that indicate the location of one or more framing components and/or indicate the location (e.g., edge or center) of the strip and/or a frame member, such as framing members of a wall, floor or roof/celling structure. When an interface strip (or a portion thereof) is attached to a first framing member, the visual framing location indications or markings 18 thereby may provide pre-determined visual markings for the location of a plurality of second first framing members to be attached to the first framing member and/or the location of the strip relative to a frame member. In some embodiments, the visual markings may be provided or configured according to traditional building techniques and/or codes (e.g., 16 and/or 24 inch markings for attaching studs to headers and/or footers for wall and/or floor/ceiling structures). In some embodiments, the visual markings may be provided or configured according to pre-determined construction plans, designs, drawings or blueprints, thereby providing specified visual marking layouts on particular interface strips based on the particular construction plan. In some embodiments, the visual markings may be provided or configured to indicate the centerline of the strip across the width direction. The visual framing location indications or markings 18 can assist an assembly/construction worker/team in error-free application during construction of a building. The visual framing location indications or markings 18 can increase framing quality control, reduce errors, reduce assembly/building time and increase durability of assemblies (e.g., wall and floor assemblies).

In some embodiments, at least one outer face of the strips (e.g., a face extending along the width and length directions) may include an adhesive (e.g., a pressure sensitive adhesive) thereon for attaching or coupling the interface strips (or portions thereof) to framing members. The adhesive may be covered by a removably shield or cover layer than prevents exposure of the adhesive until use of the interface strips (i.e., the shield layer is removed before the interface strips are coupled to a frame member). In some embodiments, an outer face of the interface strips that opposes the face of the interface strips with the visual framing location indications or markings 18 may include the adhesive. In some embodiments, an outer face of the interface strips defined or formed via the resilient layer/material may include the adhesive.

The framing interface strips can provide strength to a framed structure at the interface between adjacent or abutting framing members (for example, but not limited to, and interior sheathing surface and the framing surface of a building). The interface strips can be utilized for wall assemblies, floor/ceiling assemblies or any other frame assembling in which two structural frame members are typically coupled in direct contact.

In some embodiments, the framing interface strips may comprise an overlay of one or more pliable and malleable (e.g., plastically deformable) screen/mesh/scrim material that is coupled to one or more other layers, such as being adhered to another layer and/or partially or fully being embedded within another later. For example, a single pliable and malleable screen/mesh/scrim material layer may be utilized. As another example, one or more alternating layers of pliable and malleable screen/mesh/scrim material layers that overlie each other in the thickness direction but that to not directly touch or abut each other not may be utilized. As yet another example, one or more (e.g., two or three) alternating layers of pliable and malleable screen/mesh/scrim material layers that overlie each other in the thickness direction and that directly touch or abut each other not may be utilized.

The framing interface strips may be configured or arranged as planar or flat strips shape (i.e., not along the thickness direction) as shown in FIG. 5, or as three-dimensional shapes (i.e., extend along the thickness direction) as shown in FIGS. 1, 3 and 5. When configured or arranged as planar or flat strips, the framing interface strips may be manually pliable and malleable such that the strips can be manually deformed (e.g., plastically) into a three-dimensional shape (prior to and/or after being coupled to one or more framing member). Even if configured or arranged in a three-dimensional shape, the framing interface strips may be manually pliable such that the strips can be manually deformed (e.g., plastically) into a particular three-dimensional shape to suit a particular framing member(s) (prior to and/or after being coupled to one or more framing member). For example, the framing interface strips may be formed (as-manufactured or prior/during use) into a U-shaped channel (across its width) as shown in FIGS. 1 and 3 or into a J-shaped channel (across its width) as shown in FIG. 4. The pliable mesh layer may be configured to maintain the shape of the framing interface strip unless manually deformed by a user (i.e., maintain the shape of the framing interface in a neutral state). The framing interface strips are configured to increase the friction (i.e., increase the coefficient of friction) between typically directly abutting framing members by extending at least partially between the surfaces. The one or more layers of pliable and malleable mesh layers increase the strength of the connectivity between framing members (e.g., the structural sheathing surface and the face of the frame surface) resulting in an increase of the structural performance against lateral forces applied to the framing members (e.g., framing members of a wall assembly subjected to high wind events, environmental or other stressors).

In one aspect, the present disclosure provides a method of framing a wall structure. The method comprises substantially aligning an elongate top plate framing member and an elongate bottom plate framing member with framing member faces thereof abutting each other and outer side surfaces thereof being adjacent to each other, wherein the top plate framing member further comprises a top face opposing the framing face thereof, an inner face extending between one side of the top face and the framing member face thereof, and the outer side surface thereof extends between another side of the top face and the framing member face thereof and opposes the inner side face thereof, and wherein the bottom plate framing member further comprises a top face opposing the framing face thereof, an inner face extending between one side of the top face and the framing member face thereof, and the outer side surface thereof extends between another side of the top face and the framing member face thereof and opposes the inner side face thereof. The method further comprises overlying an elongate pliable and malleable interface strip on the abutting top and bottom plate framing members such that an engagement side surface of the interface strip extends over and abuts at least a portion of the outer face of the top plate framing member, the outer side surfaces of the top and bottom plate framing members, and at least a portion of the outer face of the bottom plate framing member. An outer side surface of the interface strip comprises a plurality of spaced visual framing location indications that extend at least partially across the outer side surfaces of the top and bottom plate framing members. The method further comprises coupling the interface strip to the top and bottom plate framing members. The method further comprises cutting the interface strip along a length of the interface strip that is substantially aligned with the interface of the abutting framing member faces and positioned between at least a portion of the inner side surfaces of the top and bottom plate framing members to form a first interface strip portion coupled to the top plate framing member and a second interface strip portion coupled to the bottom plate framing member, the first and second interface strip portions including corresponding portions of each of the plurality of spaced visual framing location indication.

In some embodiments, the method further comprises positioning a plurality of elongate framing members between the framing member faces of the top and bottom plate framing members aligned with the corresponding portions of the plurality of spaced visual framing location indications of the first and second interface strip portions. In some such embodiments, the method further comprises coupling the plurality of elongate framing members to the framing member faces of the top and bottom plate.

In some embodiments, coupling the interface strip to the top and bottom plate framing members comprises coupling the interface strip to the outer face of the top plate framing member, the outer side surfaces of the top and bottom plate framing members, and the outer face of the bottom plate framing member. In some embodiments, coupling the interface strip to the top and bottom plate framing members comprises driving a portion of a plurality of fixation members through the interface strip and into the top and bottom plate framing members. In some such embodiments, the plurality of fixation members comprise a plurality of staples or nails. In some embodiments, coupling the interface strip to the top and bottom plate framing members comprises adhering the interface strip to the top and bottom plate framing members via an adhesive. In some such embodiments, the adhesive is provided on the engagement side surface of the interface strip.

In some embodiments, the plurality of spaced visual framing location indications comprise a plurality interior indications that each define a length that extends along the length of the interface strip that is substantially the same as a thickness of corresponding elongate framing members. In some such embodiments, the plurality of spaced visual framing location indications further comprise a first end indication and a second end indication positioned at opposing end portions of the length of the interface strip, the first and second end indications each define a length that extends along the length of the interface strip that is about half of the thickness of the elongate framing members. In some such embodiments, the method further comprises positioning and affixing a plurality of the elongate framing members between the framing member faces of the top and bottom plate framing members aligned with the corresponding portions of the plurality of spaced visual framing location indications of the first and second interface strip portions.

In some embodiments, the plurality of spaced visual framing location indications each extend across a medial portion of a width of the interface strip. In some such embodiments, the plurality of spaced visual framing location indications are spaced along the length of the interface strip at a uniform spacing.

In some embodiments, the outer side surface of the interface strip further comprises a plate alignment visual indication that extends along the length of the interface strip and is positioned at a medial portion of a width of the interface strip. In some such embodiments, overlying the interface strip on the abutting top and bottom plate framing members comprises aligning the plate alignment visual indication with the interface of the abutting framing member faces of the top and bottom plate framing members. In some such embodiments, cutting the interface strip along a length of the interface strip comprises cutting the interface strip along the plate alignment visual indication.

In some embodiments the interface strip comprises at least one thin, elongate pliable and malleable mesh layer, and at least one thin, elongate resilient and compressible outer layer extending over at least one face of the at least one mesh layer, the at least one mesh layer being configured to maintain a three-dimensional shape of the interface strip, and the outer side surface of the interface strip is formed by the at least one outer layer. In some such embodiments, the at least one thin, elongate resilient and compressible outer layer comprises a first thin, elongate resilient and compressible outer layer portion extending over an outer face of the at least one mesh layer, and a second thin, elongate resilient and compressible outer layer portion extending over an inner face of the at least one mesh layer, the first thin, elongate resilient and compressible outer layer portion defining the outer side surface of the interface strip and the second thin, elongate resilient and compressible outer layer portion defines the engagement side surface of the interface strip.

In some embodiments, the at least one outer face of the interface strip provides a coefficient of friction that is greater than a coefficient of friction of the outer faces and the outer side surfaces of the top and bottom plate framing members. In some embodiments, the positions of the plurality of spaced visual framing location indications along the length of the interface strip correspond to framing member locations of a wall structure of an architectural drawing of a building structure. In some embodiments, the top and bottom plate framing members are each pieces of dimensional lumber.

In another aspect, the present disclosure provides a method of making an interface strip. The method comprises obtaining an elongate compressible, resilient, pliable and malleable first interface strip configured to maintain a three-dimensional shape and be positioned directly between first and second structural members coupled together to increase the structural integrity of the of the joint therebetween and reduce air leakage through the joint. The method further comprises forming a visual alignment indication extending along a length of the first interface strip and positioned in a medial portion of a width of the first interface strip, and a plurality of first visual framing location indications that are spaced along the length of the first interface strip and extend at least partially across a width of the first interface strip over at least one outer face of the interface strip, each first visual framing location indication including portions positioned on opposing sides of the visual alignment indication along the width direction.

In some embodiments, the first interface strip comprises a thin, elongate compressible and resilient first portion comprising a first outer face of the first interface strip configured to engage the first structural member, a thin, elongate compressible and resilient second portion comprising a second outer face of the first interface strip configured to engage the second structural member, and at least one metal mesh layer positioned between the first and second portions configured to maintain a three-dimensional shape of the first interface strip.

In some embodiments, the first visual framing location indications comprise mirror images across the visual alignment indication. In some embodiments, the method further comprises obtaining digital image file of a second interface strip that includes a plurality of second visual framing location indications that are spaced along a length of the second interface strip and is void of a visual alignment indication extending along the length of the second interface strip and is positioned in a medial portion of a width of the second interface strip, and wherein the positions of the first visual framing location indications along the length of the first interface strip correspond to the positions of the second visual framing location indications along the length of the second interface strip. In some such embodiments, forming the plurality of first visual framing location indications comprises forming mirror images of the second visual framing location indications of the second interface strip across the visual alignment indication of the first interface strip.

In another aspect, the present disclosure provides a method of making an interface strip. The method comprises digitally obtaining structural framing information for a building structure from a digital architectural construction drawing, the structural framing information including framing information for at least one wall or floor assembly that comprises a first plate framing member, a second plate framing member and a plurality of support framing members extending between framing member faces of the first and second plate framing members at particular locations along lengths of the first and second plate framing members. The method further comprises producing a digital layout of an interface strip from the structural framing information that is configured to overly at least a portion of outer faces of the first and second plate framing members that oppose the framing member faces thereof and inner sides of the first and second plate framing members that extend between the outer and framing members faces thereof when the first and second plate framing members are longitudinally aligned and stacked on one another with the framing member faces abutting, and comprises a plurality of spaced visual framing location indications along a longitudinal length thereof that correspond to the locations of the support framing members along lengths of the first and second plate framing members of the at least one wall or floor assembly. Each visual framing location indication extends across at least a portion of a width of the interface strip and includes a portion thereof that is positioned over the inner side surfaces of the first and second plate framing members when the interface strip overlies the aligned and stacked first and second plate framing members.

In some embodiments, digitally obtaining structural framing information for a building structure from a digital architectural construction drawing comprises digitally obtaining structural framing information for the building structure from computer aided design software. In some such embodiments, the computer aided design software produces the digital layout of the interface strip.

In some embodiments, digitally obtaining structural framing information for a building structure from a digital architectural construction drawing comprises obtaining a digital image of an interface strip configured to extend over at least a portion of the outer face and the inner side of only one of the first and second plate framing members.

In some embodiments, digitally obtaining structural framing information for a building structure from a digital architectural construction drawing comprises obtaining a digital image of a layout of an intermediary interface strip configured to extend over at least a portion of the outer face and the inner side of only one of the first and second plate framing members. In some such embodiments, obtaining the digital image of the layout of the intermediary interface strip comprises digitally obtaining the digital image of the layout of the intermediary interface strip from computer aided design software. In some other such embodiments, producing the digital layout of the interface strip comprises mirroring the digital image of the layout of the intermediary interface strip across its width.

In some embodiments, the method further comprises scaling the digital layout of the interface strip to the actual size the at least one wall or floor assembly.

In some embodiments, the method further comprises printing the plurality of spaced visual framing location indications of the digital layout of the interface strip on an outer face of a physical interface strip. In some such embodiments, the physical interface strip comprises: at least one thin, elongate pliable and malleable layer; and at least one thin, elongate compressible and resilient outer layer extending over at least one face of the at least one pliable and malleable layer, the at least one pliable and malleable layer being configured to maintain a three-dimensional shape of the interface strip, and the outer face of the interface strip being formed by the at least one outer layer. In some such embodiments, the at least one thin, elongate resilient and compressible outer layer comprises a first thin, elongate resilient and compressible outer layer portion extending over an outer face of the at least one pliable and malleable layer, and a second thin, elongate resilient and compressible outer layer portion extending over an inner face of the at least one pliable and malleable layer, wherein the first thin, elongate resilient and compressible outer layer portion defines the outer face of the interface strip and the second thin, elongate resilient and compressible outer layer portion defines an engagement side surface of the interface strip. In some embodiments, the digital layout of the interface strip further comprises a reference of the at least one wall or floor assembly of the building structure, and the printing further comprises printing the reference on the outer face of the physical interface strip.

In some embodiments, the method comprises producing a plurality of digital layouts of interface strips from the structural framing information that cooperatively correspond to the at least one wall or floor assembly. In some embodiments, the structural framing information includes framing information for a plurality of wall or floor assemblies of the building structure, and wherein the method comprises producing a plurality of digital layouts of interface strips from the structural framing information corresponding to the plurality of wall or floor assemblies.

In some embodiments, the plurality of spaced visual framing location indications each extend across a medial portion of the width of the interface strip. In some embodiments, the digital layout of an interface strip further comprises a plate alignment visual indication that extends along at least a portion of the length of the interface strip and is positioned at a medial portion of the width of the interface strip. In some such embodiments, each of the plurality of spaced visual framing location indications include portions positioned on opposing sides of the plate alignment visual indication along the width of the interface strip. In some embodiments, the portions of the visual framing location indications positioned on opposing sides of the plate alignment visual indication along the width of the interface strip comprise mirror image visual indications that are mirrored across the plate alignment visual indication.

In some such embodiments, the plurality of spaced visual framing location indications comprise a plurality interior indications that each define a length that extends along the length of the interface strip that is equal to a thickness of corresponding support framing members. In some such embodiments, the plurality of spaced visual framing location indications further comprise a first end indication and a second end indication positioned at opposing end portions of the length of the interface strip, the first and second end indications each define a length that extends along the length of the interface strip that is half of the thickness of the support framing members.

It should be appreciated that all combinations of the foregoing aspects and additional concepts discussed in greater detail below (provided such concepts are not mutually inconsistent) are contemplated as being part of the inventive subject matter disclosed herein.

These and other objects, features and advantages of this disclosure will become apparent from the following detailed description of the various aspects of the disclosure taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, aspects, and advantages of the disclosure will be readily understood from the following detailed description taken in conjunction with the accompanying drawings, which are not necessarily drawn to scale, wherein:

DETAILED DESCRIPTION OF THE INVENTION

Figure 1:
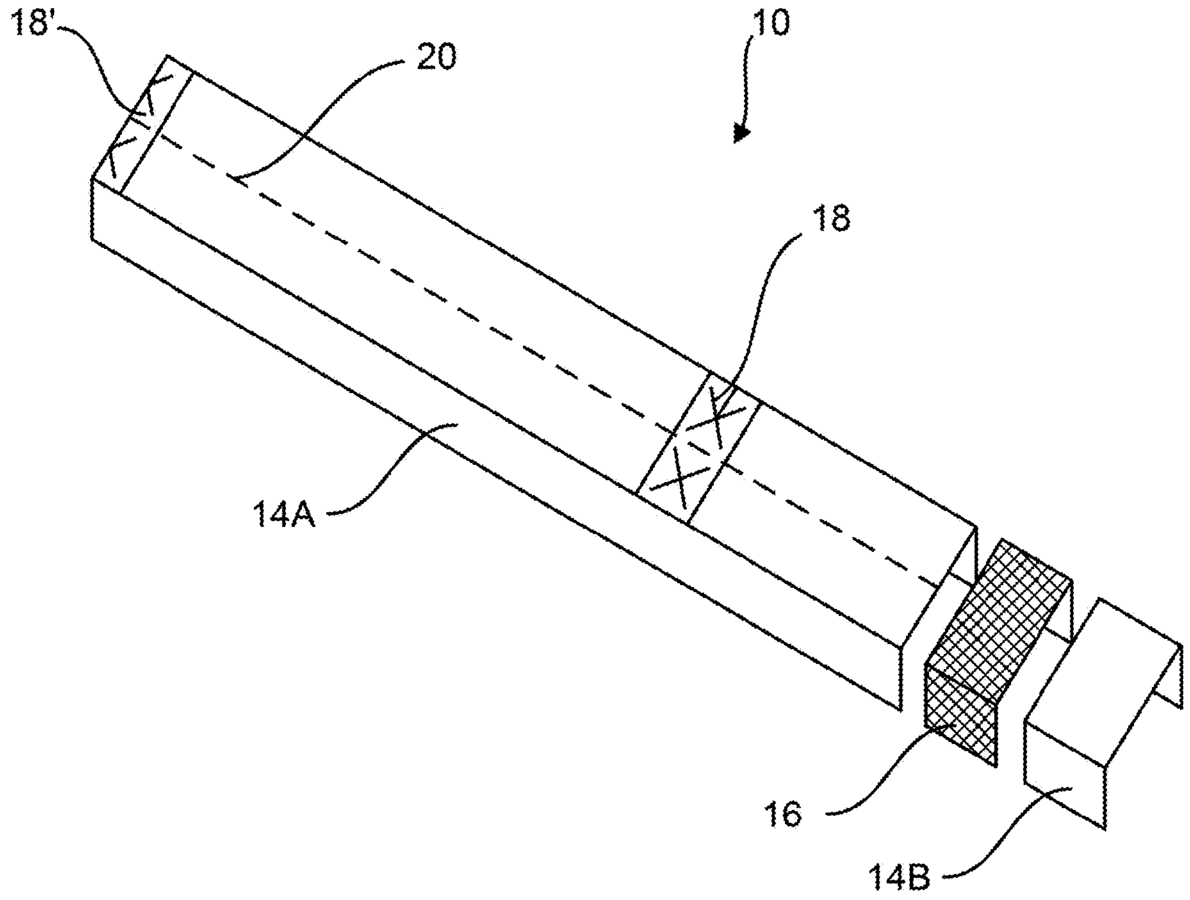
FIG. 1 illustrates an elevational perspective sectional exploded view of an exemplary framing interface strip according to the present disclosure.

Aspects of the present disclosure and certain examples, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

This application is related to U.S. Pat. Nos. 7,444,270 and 6,766,282, which are hereby expressly incorporated herein by reference in their entireties.

In one aspect, the disclosure provides framing interface strips 10 that enhance/increase the structural performance of framing structures in framed buildings, increase the coefficient of friction (COF) between adjacent (parentally coupled) framing members 12, 12A, 12B, 12C . . . 12Z (e.g., plates, flooring, foundations, sills, sheathing and any other abutting framing components or members) of framed structures (e.g., buildings), and facilitate or provide for improved framing construction efficiency and accuracy, as compared to when the strips 10 are not utilized, as shown in FIGS. 1-5

Figure 3:
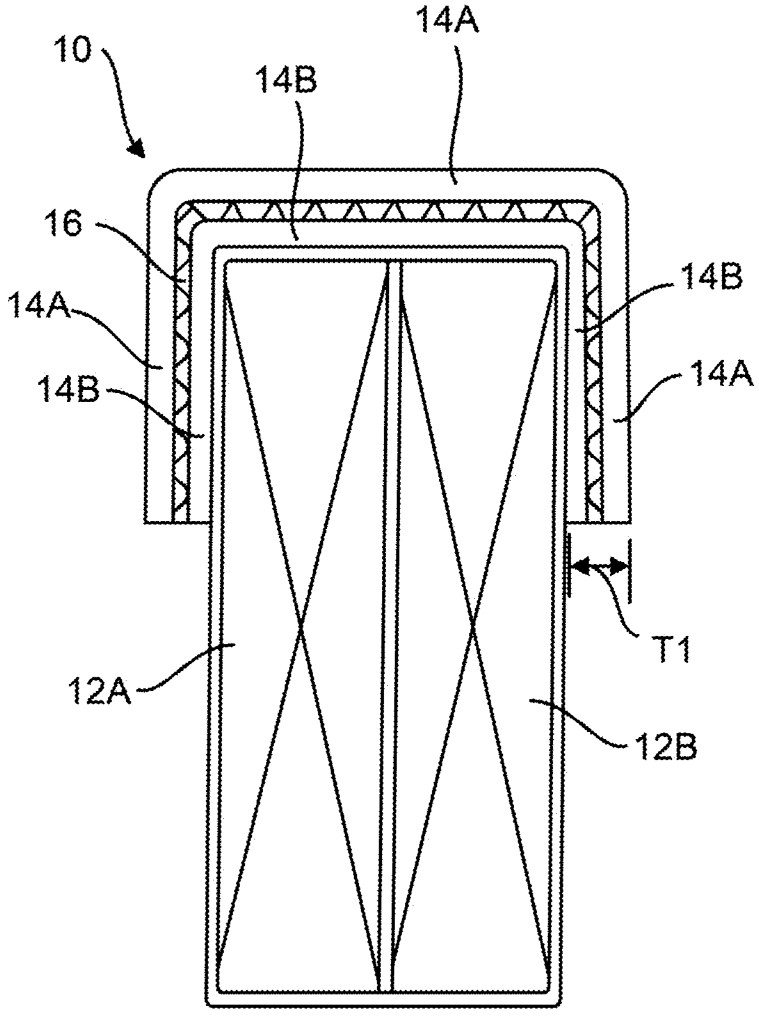
FIG. 3 is a side cross-sectional view of the exemplary framing interface strip of FIG. 1 applied to exemplary top and bottom framing plates according to the present disclosure.

In some embodiments, the framing interface strips 10 may be elongate relatively thin (in thickness) strips formed of one or more outer layers, sheets or portions 14 of a soft, resilient, compressible and/or elastically deformable, durable interface material combined with one or more inner layers or portions 16 of a pliable malleable, ductile and/or plastically deformable mesh or other "open" material (i.e., a sheet, layer or portion with a plurality of openings or through apertures extending along the thickness direction), as shown in FIGS. 1 and 3. The one or more outer resilient and/or compressible layers 14 and one or more malleable layers 16 are stacked or overlie each other in the thickness direction, and the one or more outer resilient and/or compressible layers 14 (and potentially the one or more malleable layers 16) extend entirely along the width and length directions (i.e., define the length and width dimensions of the strip 10)), as shown in FIGS. 1 and 3. The one or more malleable layers 16 may be configured to resist stretching at least along the length direction to provide stability/rigidity to the interface strip 10 as a whole along the length direction (e.g., to resist stretching when the strip 10 is placed in tension along the length direction). In some embodiments, the framing interface strips 10 may be solid along the entirety of the width and/or length of the strips 10. In some other embodiments, the framing interface strips 10 may include one or more cuts or separations extending therethrough in the thickness direction (not shown) that extend along the width direction from the outer lateral edges partially toward the middle of the strips along the width direction (and/or one or more cuts or separations extending therethrough in the thickness direction that extend along the length direction).

In some embodiments, the framing interface strip 10 may comprise an overlay of one or more pliable and malleable (e.g., plastically deformable) screen/mesh/scrim material layers or portions that is/are coupled to one or more other layer of the strip 10, such as being adhered to another layer and/or partially or fully being embedded within another layer. For example, a single pliable and malleable screen/mesh/scrim material layer 16 may be utilized. As another example, one or more alternating layers of pliable and malleable screen/mesh/scrim material layers 16 that overlie each other in the thickness direction, which may or may not directly touch or abut each other, may be utilized. As yet another example, one or more (e.g., two or three) alternating layers of the pliable and malleable screen/mesh/scrim material layers 16 that overlie each other in the thickness direction and that may or may not directly touch or abut each other may be utilized.

The at least one resilient and/or compressible layer 14 of the interface strip 10 may form the inner and/or outer faces or surfaces of the interface strip 10, as shown in FIGS. 1-4. A resilient and/or compressible layer 14 may comprise or be formed of a soft, pliable and malleable material, such as closed or open-cell polyvinyl chloride (PVC), EPDM (a rubber compound), silicone and/or other elastomeric materials/compounds that compresses and has the flexibility to fill framing gaps and voids when sandwiched between two framing members 12A, 12B (e.g., between exterior sheathing and the framing surfaces, or between top or bottom plate and abutting framing). The interface strips 10 are configured to advantageously fill such gaps and increases the coefficient of friction between the surfaces of adjacent/abutting frame members (i.e., as compared to the surfaces themselves), such as beyond code prescribed attachment/nail patterns for sheathing to frame attachment and/or top and bottom plate attachment.

The at least one inner core pliable and malleable layer 16 may comprise or be formed of an open screen/mesh/scrim(s) comprising one or more layers of non- or limited-stretch metal or fiber screen/mesh/scrim. The at least one inner core pliable and malleable layer 16 may also be configured to bend/deform/fold and maintain a desired shape (e.g., a channel or "U" shape). The at least one inner pliable and malleable layer 16 may be configured to limit the amount of longitudinal stretching of the layer 16 (and the strip 10 as a whole), which may be advantageous during printing of marking or identifications 20 on a face of the strip 10, as discussed further below.

In some embodiments, the interface strip 10 may include the inner pliable and malleable layer or portion 16 positioned between at least two of the outer resilient and/or compressible layers 14A, 14B (which can be a soft pliable material as discussed above), as shown in FIGS. 1 and 3. In some other embodiments (not shown), the inner pliable and malleable layer or portion 16 of an interface strip 10 may define or be at or proximate to an outer face of the interface strip 10, and the at least one outer resilient and/or compressible layer 14 may overly an outer side or face of the inner pliable and malleable layer or portion 16. As discussed above, in some embodiments the inner pliable and malleable layer or portion 16 may be formed of or comprise at least one welded, bonded, woven or non-woven metal layer and/or at least one fiber mesh layer. In some embodiments, the inner pliable and malleable layer 16 may be formed of metal, synthetic or natural fiber, Kevlar or like material. In some embodiments, the inner pliable and malleable layer 16 may include or form a sharp-edge (wire) mesh that is configured penetrate or bite into mating layers/components (e.g., the at least one resilient and/or compressible material layer 14) to increase or decrease load capacity thereof/of a framing member or structure coupled thereto, for example. In some embodiments, the malleable layer or portion 16 may be formed of or comprise at least one solid thin metal layer, such as at least one metal foil layer or the like.

The inner pliable and malleable layer or portion 16 may be configured to create a stronger bond between frame surfaces for greater structure durability (as compared to the frame surfaces themselves). The open property (e.g., through holes) of the inner pliable and malleable layer/portion 16 (e.g., an open-weave screen/mesh/scrim) is configured to provide stability to the interface strip 10 (e.g., allowing accurate printing/forming markings/indications on the interface strip 10). The open property (e.g., through holes) of the inner pliable and malleable layer/portion 16 may also be configured to allow an adhesive (e.g., pressure sensitive adhesive (PSA)) glue or the like provided on an outer side surface of the at least one outer resilient and/or compressible material layer 14 to flow through the openings and bond with other surfaces/material/layers/portions (such as another layer/portion of the outer resilient and/or compressible material layer 14 positioned on the opposing side surface of the inner pliable and malleable layer/portion 16), ensuring a strong bond.

The bonding of the inner open pliable and malleable layer or portion 16 with one or more soft resilient material layer(s) or portion(s) within an interface strip 10 could be accomplished via lamination of the layers/portions or embedding at least one of the layers/portions in another of the layers/portions, for example. For example, layers/portions of an interface strip 10 can be joined to allow production of various material configurations and forms, such as U- and J-shaped channels or folds that are useful in forming unique interface strips that increase structural integrity of framing/framing members 12, 12A, 12B, 12C . . . 12Z (e.g., by increasing the coefficient of friction therebetween), and that may also block air (at least partially) between abutting or adjacent framing members 12, 12A, 12B, 12C . . . 12Z.

If a lamination process is utilized, one or more layers of the inner open pliable and malleable portion 16 can be inserted between one or more layers/portions 14 of the soft, resilient compressible material, or applied as an outer surface of the resilient compressible layer(s) 14, to form an interface strip 10, for example. If a face of a soft, resilient compressible material layer/portion 14 includes exposed PSA thereon, the open nature of the inner open pliable and malleable material portion 16 can allow the PSA to flow, pass or be exposed therethrough and bond to another/next layer/portion 14 of the soft, resilient compressible material (if provided) or the face of a framing member 12 (if an opposing soft, resilient compressible material layer/portion 14 is not provided). The inner open pliable and malleable material portion 16 can thereby work to augment mesh to material bonding, making the bonded material function as a unit to increase material strength, formability and to eliminate stretching for accurate printing, for example.

Figure 2:
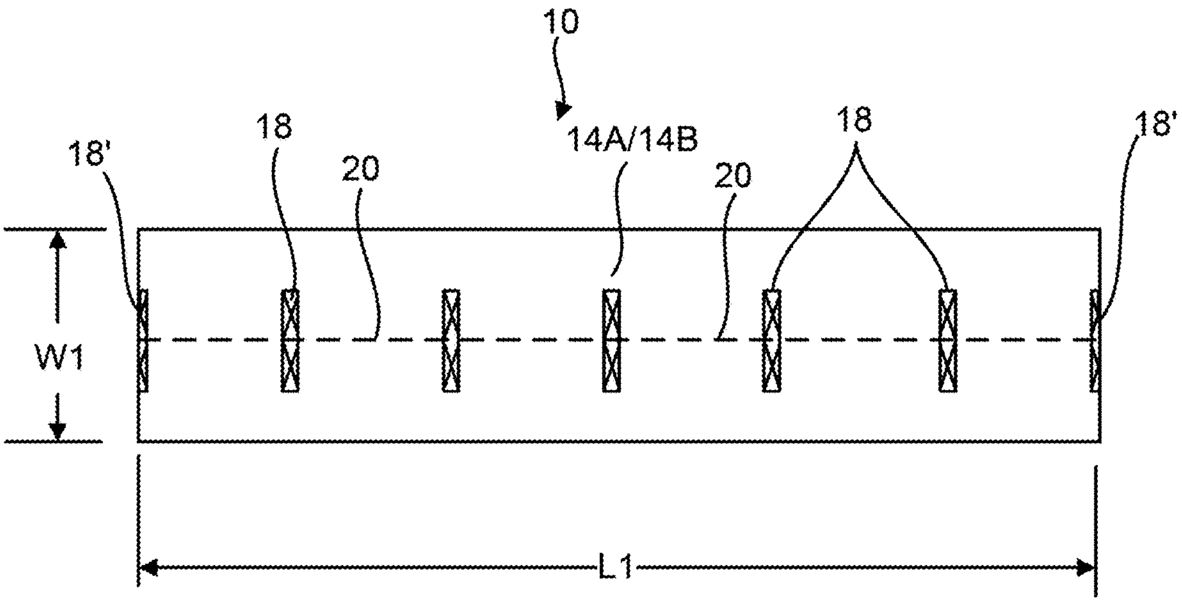
FIG. 2 is a top view of the exemplary framing interface strip of FIG. 1 according to the present disclosure.
Figure 5:
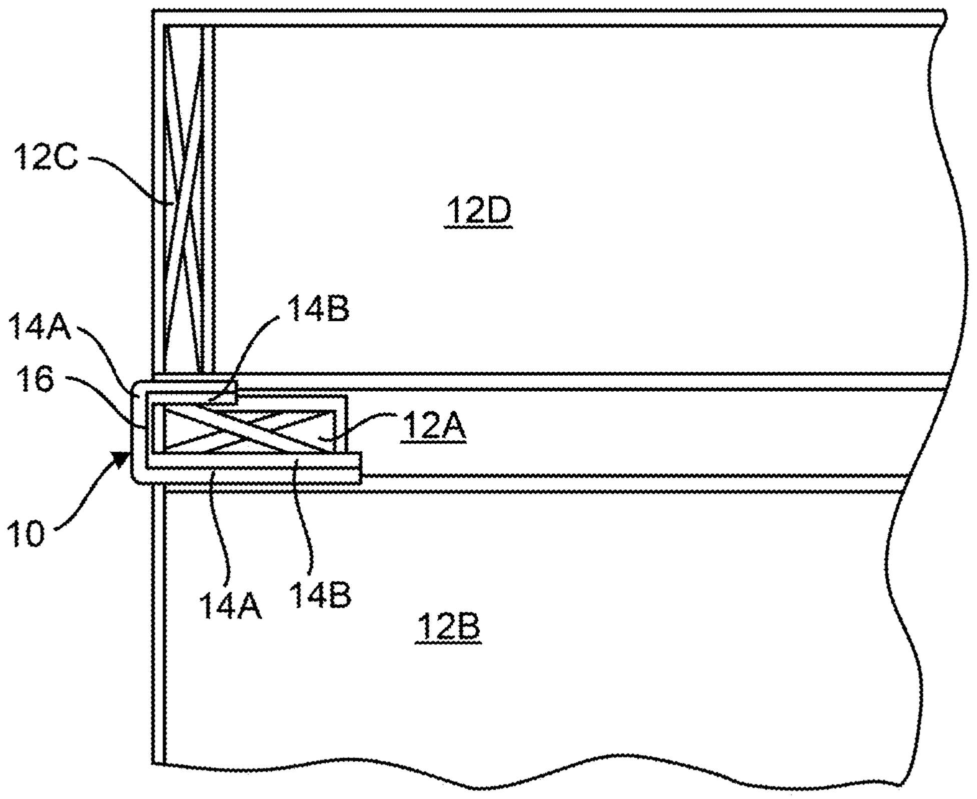
FIG. 5 is a side cross-sectional view of the exemplary framing interface strip of FIG. 1 extending between an exemplary sill plate and an exemplary foundation, and the exemplary sill plate and an exemplary rim joist and an exemplary floor joist according to the present disclosure.

In some embodiments, one or more framing interface strip 10 may be configured or arranged as a planar or flat strip shape (i.e., not along the thickness direction) as shown in FIG. 2, or as a three-dimensional shape (i.e., extend along the thickness direction) as shown in FIGS. 1, 3 and 5. In some embodiments, a framing interface strip 10 may define a total longitudinal length L1 of at least about 4 feet, such as about 8 feet, as shown in FIG. 2. In some embodiments, a framing interface strip 10 may define a total lateral width W1 when flat/planar of at least about 5 inches, such as about 6 inches, 7 inches, 8 inches, 9 inches or 10 inches, as shown in FIG. 2. In some embodiments, a framing interface strip 10 may define a thickness T1 between an outer face/side surface and an inner or engagement face/side surface of at least about 1/16 inches, such as about 3/16 inches or about 3/8 inches, as shown in FIG. 3.

The shape or physical configuration of the framing interface strip 10 can be achieved at a manufacturing stage by any process that will create a channel or a preferred shape for the interface strip 10, such as extrusion, lamination processes, embossing and/or dunk-bath formation in various viscosities of elastomeric materials. When configured or arranged as a planar or flat strip as shown in FIG. 2, the framing interface strip 10 may be manually pliable and malleable such that the strip 10 can be manually deformed (e.g., plastically) into a three-dimensional shape (prior to and/or after being coupled to one or more framing member), as shown in FIGS. 2, 3 and 5. Even if configured or arranged in a three-dimensional shape, the framing interface strip 10 may be manually pliable such that the strip 10 can be manually deformed (e.g., plastically) into another particular three-dimensional shape to suit a particular framing member(s) 12 (prior to and/or after being coupled to one or more framing member 12, 12A, 12B, 12C . . . 12Z). For example, a framing interface strip 10 may be formed (as-manufactured or prior/during use) into a U-shaped channel (across its width) as shown in FIGS. 1 and 3, or into a J-shaped channel (across its width) as shown in FIG. 5.

When configured/shaped as a channel with two lateral leg portions angled with respect to a planar medial portion, as shown in FIGS. 1, 3 and 5, a framing interface strip 10 may include at least one pair of opposing cuts or separations in the leg portions (not shown) so that the channel-shaped strip can be folded back on itself at least once in order to facilitate a smaller pre-applied or pre-used envelope or size of the strip 10. Once at a building site, a user can simply unfold such a framing interface strip 10 and attach the interface strip 10 (or a portion thereof) to one or more framing members 12, 12A, 12B, 12C . . . 12Z, such as via adhesive (potentially of the strips) or securement mechanisms that are driven partially through the strips and into the framing members 12, 12A, 12B, 12C . . . 12Z (e.g., staples, nails or the like).

The pliable and malleable mesh layer/portion 16 may be configured to maintain the shape of the framing interface strip 10 unless manually deformed by a user (i.e., maintain the shape of the framing interface strip 10 in a neutral state thereof). The framing interface strip 10 is configured to increase the friction (i.e., increase the coefficient of friction) between typically directly abutting framing members 12, 12A, 12B, 12C . . . 12Z by extending at least partially between the mating surfaces of the members 12, 12A, 12B, 12C . . . 12Z. For example, the soft compressible and/or resilient material layer(s) or portion(s) 14 of the interface strip 10 is configure to provide/form outer surfaces of the strip 10 that engage the surfaces of the framing members 12, 12A, 12B, 12C . . . 12Z (that typically directly abut or mate), and provide (as well as the interface strips as a whole) a coefficient of friction that is greater than the coefficient of friction of the surfaces of the framing members 12, 12A, 12B, 12C . . . 12Z, such as at least 10% greater, at least 25% greater, at least 50% greater or at least 100% greater, for example. In some embodiments, the framing interface strip 10 is also configured to seal the joint or interface between the typically directly abutting framing members 12, 12A, 12B, 12C . . . 12Z by extending at least partially between the mating surfaces of the members 12, 12A, 12B, 12C . . . 12Z and forming a substantially air-tight seal therebetween. For example, the soft/compressible and/or resilient material layer(s) or portion(s) 14 of the interface strip 10 may engage the surfaces of the framing members 12, 12A, 12B, 12C . . . 12Z (that typically directly abut or mate), and are substantially air tight or non-air permeable such that the strip 10, as a whole, reduces the air permeability or intrusion between the surfaces of the framing members 12, 12A, 12B, 12C . . . 12Z, such as a reduction of least 50%, at least 60%, at least 70% or at least 80% greater when tested under/in accordance with ASTM E283, for example. The one or more pliable and malleable mesh layers/portions 16 increases the strength of the connectivity between framing members 12, 12A, 12B, 12C . . . 12Z (e.g., the structural sheathing surface and the face of the frame surface) resulting in an increase of the structural performance of the framing members 12, 12A, 12B, 12C . . . 12Z against lateral forces applied thereto (e.g., to framing members of a wall assembly subjected to high wind events, environmental or other stressors).

The framing interface strip 10 may be configured to be positioned/coupled between typically-abutting framing components/members 12, 12A, 12B, 12C . . . 12Z of a frames structure or building, such as the interior surface of structural sheathing and a frame-face surface and/or top and/or bottom plates and adjacent framing members, for example. The framing interface strip 10 is configured to increase bond strength between the surfaces of the structural frame components 12, 12A, 12B, 12C . . . 12Z coupled thereto (i.e., abutting/coupled to opposing sides of the strip 10, when installed) and/or increase stability against lateral racking of the framing components 12, 12A, 12B, 12C . . . 12Z (such as framed wall assemblies). The framing interface strip can thereby increase the structural stability of the framing components 12, 12A, 12B, 12C . . . 12Z, which may be particularly advantageous for buildings located in high wind zones, seismic regions and tornado prone areas, for example.

Figure 4:
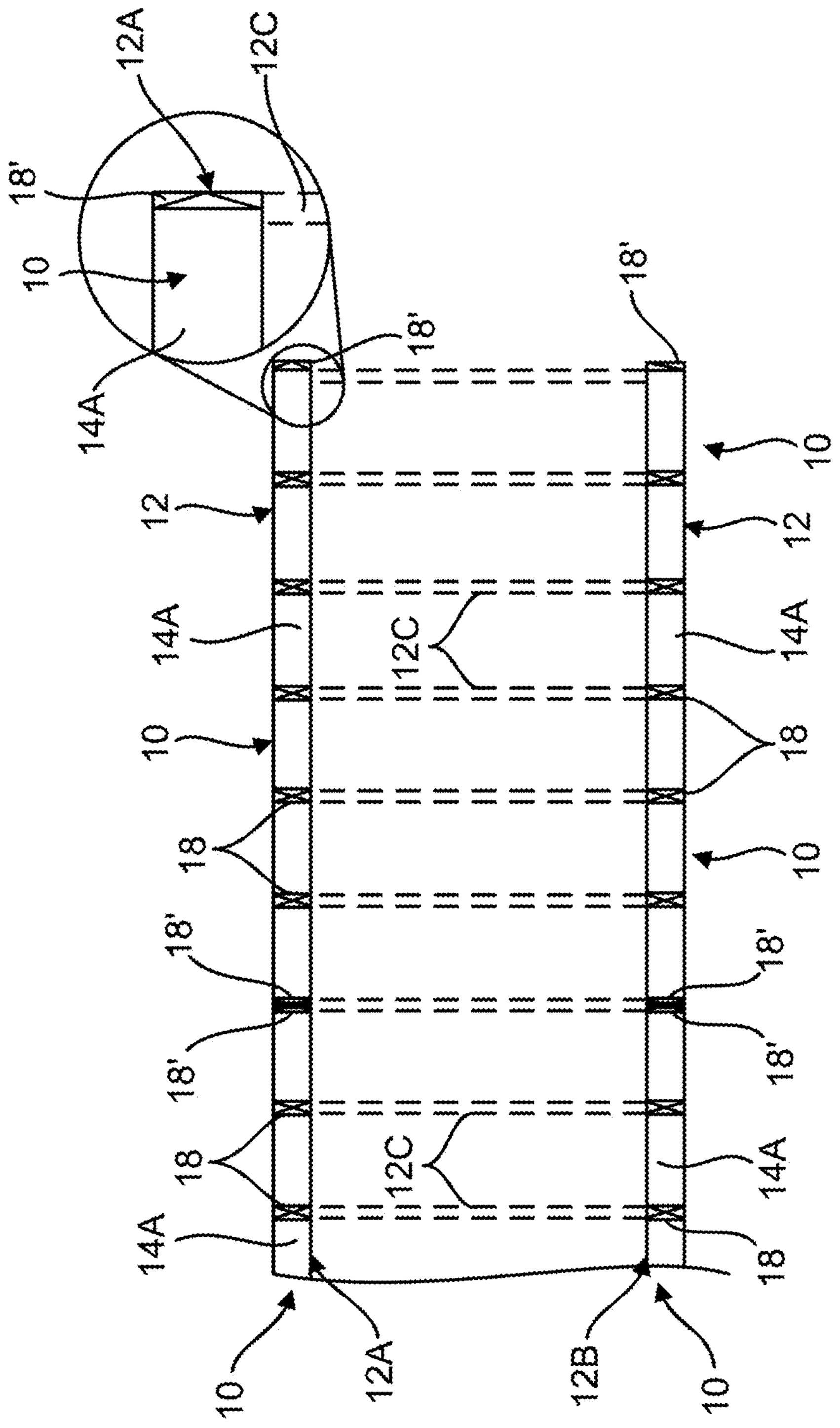
FIG. 4 illustrates a wall structure utilizing framing members and the exemplary framing interface strip and the exemplary top and bottom framing plates of FIG. 3 according to the present disclosure.

As shown in FIGS. 1, 2 and 4, at least one outer side/surface/face of the interface strip (e.g., a face extending along the width and length directions, which may be defined or formed via soft/compressible and/or resilient material layer(s) or portion(s) 14 of the interface strip 10) may include a plurality of visual framing location indications or markings 18 that are spaced along the length direction that indicate the location of framing components/members 12, 12A, 12B, 12C . . . 12Z (e.g., studs) and/or indicate the location (e.g., edge or center) of the strip 10 and/or a frame member 12, 12A, 12B, 12C . . . 12Z, such as framing members of a wall, floor or roof/celling structure. The visual framing location indications 18 may be positioned in a medial portion of the width W1 of the interface strip 10 (e.g., centered on the middle or centerline of the width W1 of the interface strip 10), and extend along the width direction, as shown in FIGS. 1, 2 and 4. In some embodiments, the visual framing location indications or markings 18 may define lengths (along the length direction) that are equal to or substantially correspond to the thickness of a corresponding framing member (e.g., a stud).

When the interface strip 10 (or a portion thereof) is attached to a first framing member 12A, 12B, the visual framing location indications or markings 18 thereby may provide pre-determined visual identifications/markings representing the locations of a plurality of second framing members 12C (e.g., studs) to be attached to the at least one first framing member 12A, 12B and/or the location of the strip 10 (or a portion thereof) relative to a framing member 12, 12A, 12B, 12C . . . 12Z. In some embodiments, the visual framing location indications or markings 18 may be provided or configured according to traditional building techniques and/or codes (e.g., 16 and/or 24 inch spaced markings for attaching studs to top plates/headers and/or bottom platers/footers for wall and/or floor/ceiling structures), as shown in FIGS. 3 and 4 for example. In such embodiments, the visual framing location indications or markings 18 may thereby be provided or configured in a repeating pattern of a consistent or even spacing along the length direction, as shown in FIGS. 1, 2 and 4. The framing members 12, 12A, 12B, 12C . . . 12Z may be any framing member 12, 12A, 12B, 12C . . . 12Z (typically elongate) and comprised of any material. For example, a framing member 12 may be a piece of dimensional lumber. As another example, a framing member 12 may be a piece of aluminum or other metal (extruded metal).

As also shown in FIGS. 1, 2 and 4 the longitudinal ends of the interface strip 10 along the length direction may align with/include end visual framing location indications or markings 18', as shown in FIG. 2. In such an embodiment, the end visual framing location indications or markings 18' may comprise half or partial visual framing location indications or markings 18 at the longitudinal ends of the interface strip 10 that define lengths of about half of that of the visual framing location indications or markings 18 (and thereby half of the thickness of corresponding framing members/studs). In this way, a pair of adjacent interface strips 10, 10 can be aligned/abutted at their longitudinal ends to seamlessly continue/form the repeating pattern of the visual framing location indications or markings 18 without interruption thereof, as shown in FIG. 4. The visual framing location indications or markings 18 assist an assembly/construction worker/team in error-free construction of framing members of a structure or building. The visual framing location indications or markings 18 thereby increase framing quality control, reduce errors, reduce assembly/building time and increase durability of faming assemblies (e.g., wall and floor assemblies). In some embodiments, the visual framing location indications or markings 18 may be provided or configured according to pre-determined construction plans, designs, drawings or blueprints, thereby providing specified visual marking layouts on particular interface strips 10 based on the corresponding construction plan.

As shown in FIGS. 1 and 2, at least one face/side surface (e.g., at least the outer face/side surface) of the interface strip 10, such as at least a face/side surface of the interface strip 10 including the visual framing location indications or markings 18, includes an alignment and/or separation visual indication 20 that extends along at least a portion of the total length L1 of the interface strip 10 (e.g., the entirety of the total length L1 of the interface strip 10) and is positioned at a medial portion of the width W1 of the interface strip 10. For example, the alignment and/or separation visual indication 20 may be positioned at the middle or center of the total width W1 of the interface strip 10, and thereby comprise a centerline of the interface strip 10. In some embodiments, the alignment and/or separation visual indication 20 indicates the centerline of the interface strip 10 across the width W1 direction, as shown in FIG. 2. The visual framing location indications or markings 18 extend across or otherwise be provided on either side of the alignment and/or separation visual indication 20 in the width direction, as shown in FIGS. 1 and 2. For example, the visual framing location indications or markings 18 may include portions positioned on opposing sides of the of the alignment and/or separation visual indication 20 in the width direction, as shown in FIGS. 1 and 2. In some embodiments, the visual framing location indications or markings 18 are mirrored across or with respect to the alignment and/or separation visual indication 20 in the width direction, as shown in FIGS. 1 and 2.

In some embodiment, the visual framing location indications or markings 18 may include framing marks on one or either face of the interface strip 10 (and comprise one or two or more differing framing spacing's differently visually identifiable), which simplifies framing installation and increase productivity of an end-user. For example, both wall and frame assemblies can benefit from the pre-printed/formed visual framing location indications or markings 18 on the interface strip 10. A framing layout printed on one or more face of the interface strip 10 via the visual framing location indications or markings 18 can serve as a framing guidance tool for accuracy and proficiency of placement of framing members by less skilled laborers who can be utilized in a tight skilled-labor market at less cost. Each visual framing location indications or markings 18 may be clearly indicated, simplifying building and improving quality control and quality assurance by eliminating common framing misplacement. The visual framing location indications or markings 18 of the interface strip 10 can increase jobsite productivity by allowing a more visible pretrial of a frame structure prior to assembly by all assembly personnel. The visual framing location indications or markings 18 of the interface strip 10 can be utilized for training and work-force development proposes. The visual framing location indications or markings 18 or indications on one or more face of the interface strip 10 may be formed via any method, technique or process, such as being printed by any of a variety of compatible modern printing methods or otherwise formed on the interface strip 10.

The visual framing location indications or markings 18 on one or more face of the interface strips may be configured to be used bi-directionally, that is to be used by a right handed or left handed person, working from right to left or left to right, respectively. In some embodiments, the visual framing location indications or markings 18 on one or more face of the interface strips may comprise framing marks for walls, and thereby may be generally 16 or 24 inch spaced markings on center along the length direction and be about 1½ inches long (i.e., wide or thick along the length direction). In some other embodiments, such as for floor and wall assemblies, the visual framing location indications or markings 18 may be variably spaced corresponding to the locations of engineered floor components and/or the locations of framing indicated in architectural construction drawings or plans of structural framing of a building structure (e.g., contained in CAD drawing files or other digital or digitized drawings of structural framing of a building structure).

In some embodiments, the visual framing location indications or markings 18 on one or more face of the interface strip 10 (and potentially the strip 10 itself) may be provided at industry standard increments/lengths that equal 4 feet, 8 feet and generally multiples of two feet increments along the length direction. The general practice for carpenters is to subtract ¾ inch for every 16 or 24 inch on-center spacing of frame members 12 (such as for wall and floor assemblies), so that the outer edges of 4 feet by 8 foot sheets of sheathing or drywall fall on-center of the frame member 12, thereby making for more efficient carpentry and maximizing materials usage. For example, to fall on 16 inches on-center, a carpenter can measure from the end of a framing member about 15¼-15½ inches and make a first mark, and then measure 16 inches therefrom for every additional layout mark until the left or right hand marks indicate the edge of a 1½ inch wide framing member 12 (e.g., stud). This type of tedious, repetitive work is prone to errors.

The interface strip 10 of the present disclosure can be configured to provide visual framing location indications or markings 18 on one or more face thereof spaced at defined (and potentially uniform) spacings, such as at industry standard increments/lengths, to avoid such a tedious and error prone process. As shown in FIGS. 1 and 3, one or more face of the interface strip 10 may include a half or end visual framing location indications or markings 18' at one or both longitudinal ends. By starting with an end visual framing location indications or markings 18', a plurality of strips 10 can be aligned with the edge of a framing member 12, such plate, and all other visual framing location indications or markings 18 are automatically and mathematically arranged to ensure that on-center spacing is maintained throughout/along the framing member 12 that the interface strip 10 overlays (and is potentially coupled to). The visual framing location indications or markings 18 can thereby speed up a framing process because all the framing positions are indicated by the interface strip 10, thereby reducing labor, time and expense.

As shown in FIGS. 1 and 3, one or more visual framing location indications or markings 18 of the interface strip 10 may include two lines corresponding the thickness of a corresponding framing member or stud 12 (e.g., 1½ inches apart), potentially with two "X" marks or other symbols or markings therebetween arranged or space along the width direction and on opposing sides of the alignment and/or separation visual indication 20 along the width direction. In this way, the interface strip 10 may be cut or otherwise broken or divided along the alignment and/or separation visual indication 20 to form first and second interface strip portions that each include a portion of the visual framing location indications or markings 18, such as each visual framing location indications or markings 18 of the first and second interface strip portions including the two lines and one "X" therebetween, to clearly indicate placement of framing members 12C with respect to (e.g., between) first and second framing members 12A, 12B coupled to the first and second interface strip portions, respectively (which can further aid less experienced assembly personnel). The "full" indications/markings of the visual framing location indications or markings 18 may comprise any visual shape(s) or indication(s), such as any shape(s) or indication(s), such as any shape or indication that includes or defines lengths that correspond to the thickness of a corresponding framing member/stud 12C or and end/side or portion (e.g., center) thereof. Similarly, the end visual framing location indications or markings 18' of the visual framing location indications or markings 18 may comprise any visual shape(s) or indication(s), such as any shape(s) or indication(s), such as any shape or indication that includes or defines lengths that correspond to half the thickness of a corresponding framing member/stud 12C or and end/side or portion (e.g., center) thereof.

As shown in FIGS. 1 and 4 and discussed above, one or more face of the interface strip 10 may include the end visual framing location indications or markings 18' on the opposing longitudinal ends of the strip 10 so that multiple strips 10 can simply butt together in order to create longer framed assemblies while always maintaining an accurate layout (see FIG. 4). Further, by starting and ending with an end visual framing location indications or markings 18' along the length direction, the interface strip 10 can be used in either right or left hand layout applications. In some embodiments, the visual framing location indications or markings 18 can include "leg" extensions (not shown) that extend along the lateral sides or edge portions (along the width and/or thickness directions) that indicate the framing attachment locations even after the medial portion of the width of the strip 10 (or a portion thereof) (or another portion thereof containing the visual framing location indications or markings 18) abuts or is covered by a framing member 12, 12A, 12B, 12C . . . 12Z, for example.

In some embodiments (not shown), the visual framing location indications or markings may include first and second markings that differ visually, such as comprising differing colors and/or shapes/indications, and correspond to differing spacings or framing member layouts. For example, the visual framing location indications or markings may include a first of markings of a first color and/or shape that are spaced at 16 inches on center, and a second of markings of a second color and/or shape that differs from the first color and/or shape that are spaced at 24 inches on center. In some such embodiments, the first and second sets of markings may be provided on the same side or face of the interface strip 10, or may be provided on differing sides or faces of the interface strip 10.

As described above, in some embodiments, the alignment and/or separation visual indication 20 may comprise a centerline indication of the width of the interface strip 10. The alignment and/or separation visual indication 20 may be utilized to align the interface strip 10 to an edge of one or more frame member 12, or to the junction or interface of first and second frame members 12A, 12B (e.g., first/top and second/bottom plate framing members), for example. The alignment and/or separation visual indication 20 may also utilized a cut/separation guide to facilitate the cutting or other separation of the interface strip 10 into the first and second interface strip portions, as described above. For example, the interface strip 10 may be cut/separated along or proximate to the alignment and/or separation visual indication 20 along the entire length L1 of the interface strip 10 to divide the interface strip 10 into the first and second interface strip portions. For example, if the interface strip 10 is to be used with a pair of separate and distinct frame members 12A, 12B so as to provide a separate and distinct strip portion for each frame member 12A, 12B, as shown in FIG. 3, the strip 10 can be separated along the alignment and/or separation visual indication 20. In such an embodiment, the interface strip 10 may include "mirror image" visual framing location indications or markings 18 on each side of the alignment and/or separation visual indication 20 along the width direction so that once the interface strip 10 is attached to the first and second framing members 12A, 12B (e.g., top and bottom plates, for example) as shown in FIG. 3, the interface strip 10 can be cut or otherwise separated (e.g., with a blade, knife, saw, pull-strip or string, etc.) along its length to form a first strip portion with a portion of the visual framing location indications or markings 18 and a second first strip portion with the other portion of the visual framing location indications or markings 18. In this way, framing members 12C attached between corresponding visual framing location indications or markings 18 of the first and second strip portions will extend parallel to one another, as shown in FIG. 4.

In some embodiments, at least one outer face of the interface strip 10 (e.g., a face extending along the width and length directions) may include an adhesive (e.g., a pressure sensitive adhesive) thereon for attaching or coupling the interface strip 10 to one or more framing member 12, 12A, 12B, 12C . . . 12Z. The adhesive may be covered by a removable shield or cover layer than prevents exposure of the adhesive until use of the interface strip 10 (i.e., the shield layer is removed before the interface strip 10 is coupled to a frame member 12, 12A, 12B, 12C . . . 12Z). In some embodiments, an outer face of the interface strip 10 that opposes the face of the interface strip 10 with the visual framing location indications or markings 18 may include the adhesive. In some embodiments, an outer face of the interface strip 10 defined or formed via the soft/compressible and/or resilient material layer(s) or portion(s) 14 may include the adhesive.

The framing interface strip 10 is configured to provide strength to a framed structure at the interface between adjacent or abutting framing members 12, 12A, 12B, 12C . . . 12Z (for example, but not limited to, interior sheathing one or more framing members and/or top and bottom plate framing members and framing members coupled thereto). The interface strip 10 can be utilized for wall assemblies, floor/ceiling assemblies or any other frame assembling in which two structural frame members 12, 12A, 12B, 12C . . . 12Z are in direct contact.

The interface strip 10 can be utilized between framing members 12, 12A, 12B, 12C . . . 12Z to aid the stability of the framing. When utilized between framing members 12, 12A, 12B, 12C . . . 12Z (e.g., coupled to at least one of the members), the interface strip 10 enhance the structural integrity of the framing formed therefrom by increasing the coefficient of friction (COF) between the mating surfaces of the framing members 12, 12A, 12B, 12C . . . 12Z. An increased COF at the interface between framing members 12, 12A, 12B, 12C . . . 12Z effectively increases the ability of the framing to resist lateral forces. For example, an increased COF at the interface strip-to-first framing member 12A (e.g., sheathing interface or top/bottom plate interface), the interface strip 10-to-second frame member 12B (e.g., plate and/or stud), and the first and second frame member 12A, 12B interface (as a result of the interface strip 10 being positioned therebetween) increases resistance to lateral forces of the frame assembly, such as due to high winds, seismic activity, tornados (two thirds of US territory is prone to tornado, hurricane and seismic activity), and other possible stressors.

In some embodiments, when applied or coupled between or at the interface of two framing members 12A, 12B (e.g., wood framing members), the interface strip 10 may be configured to increase the coefficient between the members 12A, 12B (i.e., as compared to if the interface strip 10 is not utilized) by at least 20%, or by at least 25%, or by at least 30%, or by at least 35%, by at least 40%, or by at least 45%, or by at least 50%, or by at least 55%, by at least 60%, or by at least 65%.

It is noted that the interface strip 10 can be configured to resist degradation due to sunlight (e.g., UV light). For example, the interface strip 10 can be configured to be embedded or contained within the joint or interface of two frame members 12A, 12B (e.g., within a sheathing/plate/frame interface). The interface strip 10 can also be utilized to improve the efficiency of onsite and off-site framing installation or assembly. When coupled to at least one framing member 12, 12A, 12B, 12C . . . 12Z, the interface strip 10 can serve as a building template via the visual framing location indications or markings 18 provided thereon (as it is highly stretch resistant).

In some embodiments, the interface strip 10 may be formed by moving liquid or semi-liquid material (that forms the outer resilient and/or compressible material layer(s) or portion(s) 14) through an extruder over at least one side/face (e.g., over one face or over opposing faces) the one or more pliable and malleable mesh layers/portions 16, and potentially substantially simultaneously forming the construct into a desired three-dimensional shape (e.g., a channel). With the one or more pliable and malleable mesh layers/portions 16 embedded in the resilient and/or compressible material layer(s)/portion(s) allows formation of angles and bends that are maintained during use. By having a resilient compressible interface strip 10 that is fortified via the one or more pliable and malleable mesh layers/portions 16, the strip 10 is able to conform to the angles and bends of a framing surface, and the surfaces/interfaces of the adjacent/abutting framing members 12, 12A, 12B, 12C . . . 12Z are structurally enhanced. The interface strip 10 can thereby allow minimal movement between the framing surfaces when the framing assembly (e.g., building structure) is subjected to relatively strong lateral forces. Such strong forces can result from high winds, seismic activity or other stressors, for example. Relative movement between adjacent/abutting framing members 12, 12A, 12B, 12C . . . 12Z can create heat due to friction, which can act to soften the interface strip 10. When softened in this manner, the interface strip 10 may be configured to become "stickier" or "softer" (increasing the coefficient of friction), increasing bonding of adjacent/abutting framing members 12, 12A, 12B, 12C . . . 12Z (and re-activating the adhesive of the interface strip 10, if provided) to further bond the surfaces for increased structural performance. In a seismic event, the interface strip 10 (e.g., particularly the resilient and/or compressible material layer(s) or portion(s) 14 thereof) can acts as a shock absorber to help dampen and dissipate shockwaves to the framed structure.

As a result, the interface strip 10 can provide for improved structural framing assemblies that are able to withstand much higher lateral forces than as compared to when the interface strips 10 are not utilized, by decoupling or spacing the adjacent/abutting framing member surfaces via the interface strips 10 installed therebetween, thereby creating an improved bond that is pliable enough to be a deadening and damping factor between the surfaces. The interface strip 10 can thereby improve stability and formability, a means for implementation, to improve structural stability and durability for framed structures.

In some embodiments, when the interface strip 10 is positioned and compressed between the adjacent/abutting framing member surfaces, the increase in friction between these surfaces is transmitted to the framing/structural members 12, 12A, 12B, 12C . . . 12Z themselves (such as horizontal plates and vertical studs). The one or more pliable and malleable mesh layers/portions 16 of the interface strip 10 may facilitate bonding or integration between the layers/portions of the interface strip 10 and to the interface strip 10 itself. This phenomenon also increases the ability of the interface strip 10 to retain its shape, such as when folded by hand or machine, into different three-dimensional configurations, which that may contribute to a more rapid installation by end-users. Shapes/configurations of the interface strip 10, such as a C- or J-type configuration, can be formed onsite or during the manufacturing process. Pre-bending the interface strip 10 to a required shape/size may accelerate installation time while improving quality control, and simplifying the process for end users. Differently sized pliable and malleable mesh layers/portions 16 (and/or the interface strip 10 as a whole) can be utilized, such as based, at least in part, on various load conditions that a designer or engineer requires for structural stability.

In some embodiments, the interface strip 10 may be attached to one or more framing members 12, 12A, 12B, 12C . . . 12Z themselves (such as horizontal plates and vertical studs). The one or more pliable and via attachment members or an adhesive. For example, the interface strip 10 may be attached to framing plates or other framing members 12, 12A, 12B, 12C . . . 12Z themselves (such as horizontal plates and vertical studs). The one or more pliable and by stapling, tacking or nailing the interface strip 10 onto a pair of abutting plate framing members 12A, 12B (e.g., 2 by 4 inch or 2 by 6 inch plates) while the plates 12A, 12B lie side-by-side facing upward (facing "upward" means the 1½ inch portion of the plates are required to face upward with the reverse side 1½ inch plate surface being parallel to the ground), and the longer surface of the plates 12A, 12B facing outward (with the 4 inch or 6 inch plate surfaces being perpendicular to the ground), as shown in FIG. 3. In this arrangement, the interface strip 10 can be separated along the alignment and/or separation visual indication 20 into two plate strip portions for the two plates 12A, 12B so that both plates 12A, 12B can be utilized with an interface strip portion when applying/coupling other framing members 12C thereto so the mating structural member(s) (e.g., structural sheathing, plates, etc.) come into contact with the interface strip 10 to create a high COF therebetween and/or are aligned via the visual framing location indications or markings 18. In some other arrangements, one or more faces of a framing member 12 may be completely covered or surrounded by the interface strip 10. For example, two channel-shaped interface strips 10 may be applied over opposing sides of a frame member 12 (e.g., a wooden frame member) to completely surround the frame member 12 to form a full capillary break between the frame member 12 and one or more mating frame member (e.g., a wooden, masonry or metal frame member, for example). As another example, the interface strip 10 may be configured as a sleeve to completely wrap around or surround a framing member 12 (e.g., a plate) in a seamless fashion, which may act to further increase the holding power thereof via the increased COF and/or provide a full capillary break.

In some embodiments, the interface strip 10 may be attached to one or more framing member 12, 12A, 12B, 12C . . . 12Z via a two-part or two-component adhesive. In some such embodiments, a first part or component of the adhesive may be applied to one or more framing members 12, 12A, 12B, 12C . . . 12Z, and the second part or component of the adhesive may be applied to or incorporated within the interface strip 10. For example, the first part or component of the adhesive may be a wafer type epoxy stick or glue bonding solution applied or coupled to one or more framing members 12, 12A, 12B, 12C . . . 12Z at locations that will aid in the attachment of the components together, which may provide for greater ability to withstand lateral loads. The interface strip 10 may include the second part or component of the adhesive, which may be a catalyst for the first part or component of the adhesive. In some embodiments, both the first and second parts or components of the adhesive may be provided on the interface strip 10. For example, the interface strip 10 may include the first and second parts or components of the adhesive overlying each other on at least one face thereof that are separated by a film. The film may be configured to break, separate, disintegrate or otherwise allow the first and second parts or components of the adhesive to interact with each other after frame members 12, 12A, 12B, 12C . . . 12Z are abutted or attached to the opposing faces of the interface strip 10. For example, the film may be configured such that the weight/force applied by the frame components 12, 12A, 12B, 12C . . . 12Z, vibration of the frame components 12, 12A, 12B, 12C . . . 12Z and/or penetration by one or more fastening mechanism "breaks" the film to allow the first and second parts or components of the adhesive to merge together and securely adhere the strip 10 to the one or more framing members 12, 12A, 12B, 12C . . . 12Z.

The interface strip 10 of the disclosure can thereby be utilized to frame a structure, such as to frame a wall structure of a building structure as shown in FIGS. 3 and 4, or to frame a floor and/or ceiling of a building structure as shown in FIG. 5, for example.

With reference to FIGS. 3 and 4, a method of framing a wall structure may include substantially aligning an elongate top plate framing member 12A and an elongate bottom plate framing member 12B with framing member faces thereof abutting each other and outer side surfaces thereof being adjacent to each other. The top plate framing member 12A may further include a top face opposing the framing face thereof, an inner face extending between one side of the top face and the framing member face thereof, and the outer side surface thereof extends between another side of the top face and the framing member face thereof and opposes the inner side face thereof, as shown in FIG. 3. Similarly, the bottom plate framing member 12B further comprises a top face opposing the framing face thereof, an inner face extending between one side of the top face and the framing member face thereof, and the outer side surface thereof extends between another side of the top face and the framing member face thereof and opposes the inner side face thereof, as shown in FIG. 3. In some embodiments, the top and bottom plate framing members 12A, 12B are each pieces of dimensional lumber, such as 2×4's, 2×6's, 2×8's, 2×10's, 2×12's, 4×4's, etc. As described above, the interface strip 10 may provide a coefficient of friction that is greater than a coefficient of friction of the outer faces and the outer side surfaces of the top and bottom plate framing members 12A, 12B.

As described above, in some embodiments, the positions of the plurality of spaced visual framing location indications 18 along the length of the interface strip 10 may correspond to framing member locations of a wall structure of an architectural drawing of a building structure. As described above, in some embodiments, the plurality of spaced visual framing location indications 10 may each extend across a medial portion of a width W1 of the interface strip 10. As also described above, in some embodiments, the plurality of spaced visual framing location indications 18 may each define a length that extends along the length L1 of the interface strip 10 that is substantially the same as a thickness of corresponding elongate framing members 12C, and/or may be spaced along the length L1 of the interface strip 10 at a uniform and/or even spacing. As described above, in some embodiments, the markings/outer side surface of the interface strip 10 may also comprise a centerline or plate alignment and separation visual indication that extends along the length L1 of the interface strip 10, and is positioned at a medial portion (or at the middle) of the width W1 of the interface strip 10.

As described above, in some embodiments, the interface strip 10 comprises at least one thin, elongate pliable and malleable mesh layer or portion 16, and at least one thin, elongate resilient and compressible outer layer 14 extending over at least one face of the at least one mesh layer 16. The at least one mesh layer 16 may be configured to maintain a three-dimensional shape of the interface strip 10, and the outer side surface of the interface strip 10 may be formed by the at least one outer layer 14. As described above, in some embodiments, the interface strip 10 may include a first thin, elongate resilient and compressible outer layer portion 14A extending over an outer face of the at least one mesh layer (and potentially defining the outer side surface of the interface strip 10), and a second thin, elongate resilient and compressible outer layer portion 14B extending over an inner face of the at least one mesh layer (and potentially defining the engagement side surface of the interface strip 10).

The method may then include overlying the interface strip 10 on the abutting top and bottom plate framing members 12A, 12B such that the engagement side surface of the interface strip 10 extends over and abuts at least a portion of the outer face of the top plate framing member 12A, the outer side surfaces of the top and bottom plate framing members 12A, 12B, and at least a portion of the outer face of the bottom plate framing member 12B, as shown in FIG. 3. The markings 18 would thereby extend at least partially across the outer side surfaces of the top and bottom plate framing members 12A, 12B.

The method may also include coupling the interface strip 10 to the top and bottom plate framing members 12A, 12B. For example, the interface strip 10 may be coupled to the outer face of the top plate framing member 12A, the outer side surfaces of the top and bottom plate framing members 12A, 12B, and the outer face of the bottom plate framing member 12B. In some embodiments, the interface strip 10 may be coupled to the top and bottom plate framing members 12A, 12B by driving portions of a plurality of fixation members (staples or nails) through the interface strip 10 and into the top and bottom plate framing members 12A, 12B. In some embodiments, the interface strip 10 may be coupled to the top and bottom plate framing members 12A, 12B by adhering the engagement surface of the interface strip 10 to the top and bottom plate framing members 12A, 12B via an adhesive, which may be provided on the engagement side surface of the interface strip 10 and/or on the top and bottom plate framing members 12A, 12B.

After the interface strip 10 is coupled to the top and bottom plate framing members 12A, 12B, the interface strip 10 may be cut therethrough or otherwise separated along a length of the interface strip 10 that is substantially aligned with the interface of the abutting framing member faces and positioned between at least a portion of the inner side surfaces of the top and bottom plate framing members 12A, 12B. The interface strip 10 may thereby be cut or otherwise separated into a first interface strip 10 portion coupled to the top plate framing member 12A, and a second interface strip portion coupled to the bottom plate framing member 12B, as shown in FIG. 4. For example, the interface strip 10 may be cut along the centerline marking 18 (see FIG. 1). The first and second interface strip portions can thereby include corresponding portions of each of the plurality of markings 18, as shown in FIG. 4.

With the top and bottom plate framing members 12A, 12B separated and including the first and second interface strip portions coupled thereto, respectively, the method may then include spacing the top and bottom plate framing members 12A, 12B and positioning a plurality of elongate framing members 12C (e.g., studs) between the framing member faces of the top and bottom plate framing members 12A, 12B that are aligned with the corresponding portions of the plurality of spaced visual framing location indications 18 of the first and second interface strip portions, as shown in FIG. 4. The framing members 12C may then be fixed or attached to the top and bottom plate framing members 12A, 12B (e.g., via nails, screws and/or adhesive).

In another embodiment (not shown), a wall-opening framing interface strip may be configured as a window and/or door interface strip that overlays the interface strip 10 (which overlies and is coupled to one or more framing members, as described above) and facilitates the framing for a window or door opening in a wall by providing reference markings for at least the left and right stud locations of the opening (for the installation of a window or door therein). The wall-opening framing interface strip may be configured the same or similar as the interface strip 10, as disclosed above. For example, the wall-opening framing interface strip may be comprised of one or more of the same materials of the interface strip 10. In some other embodiments, the wall-opening framing interface strip may be configured different than the interface strip 10 (as disclosed above). For example, the wall-opening framing interface strip may be thinner than the interface strip 10. In some such embodiments, the wall-opening framing interface strip may not include the malleable layer or portion 16 and/or the outer resilient/compressible layers 14A, 14B. That it, the wall-opening framing interface strip rely on the interface strip 10 positioned under the wall-opening framing interface strip for the sealing and/or damping functions (as described above), and include special visual framing location indications or markings 18 on an outer side or top surface thereof. In some other embodiments, the wall-opening framing interface strip may include a thinner malleable layer or portion 16 and/or resilient/compressible layer(s) 14A, 14B as compared to the interface strip 10.

An inner or bottom engagement side or surface of the wall-opening framing interface strip may or may not include an adhesive or other coupling material that couples the wall-opening framing interface strip to the underlying interface strip 10 (as described above with respect to the interface strip 10). For example, in some embodiments the inner or bottom engagement side or surface of the wall-opening framing interface strip may include an adhesive mechanism or configuration (e.g., a peel-and-stick type arrangement). In some other embodiments, the inner or bottom engagement side or surface of the wall-opening framing interface strip may abut the underlying interface strip 10, and be coupled to the interface strip 10 via fastening mechanisms (e.g., staples, nails, tacks, etc.) that extend into/through the underlying interface strip 10 and framing member(s) (as described above with respect to the interface strip 10).

The special visual framing location indications or markings 18 on the top or outer side of the wall-opening framing interface strip are configured as window and/or door framing layout references. The visual framing location indications or markings 18 of the wall-opening framing interface strip includes a center visual indication or marking that is positioned at the longitudinal center or middle of the wall-opening framing interface strip along its longitudinal length L1. In this way, the center visual indication or marking can be used to identify the longitudinal center of the wall-opening framing interface strip and the door/window that is referenced/framed by the special visual framing location indications or markings 18. The center visual indication or marking can thus also be utilized to position the wall-opening framing interface strip on the interface strip 10 and the first and second framing members 12A, 12B based on the preferred/planned position of the door/window.

The visual framing location indications or markings 18 on the top or outer side of the wall-opening framing interface strip also includes at least two stud location markings on each (i.e., both) longitudinal end portions of the strip along its longitudinal length L1 to identify the framing members that frame the left and right sides of the door/window opening that is framed via the strip. For any door/window opening that is framed via the strip that is four feet or wider, the special visual framing location indications or markings 18 may include at least three location markings on each (i.e., both) longitudinal end portions of the strip to identify the framing members. In some embodiments, the wall-opening framing interface strip may include visual framing location indications or markings 18 for differing sized windows, differing sizes doors, and/or at least one window and at least one door.

In some embodiments, the visual framing location indications or markings 18 may include an image or other visual indication of a window and/or door that the wall-opening framing interface strip is configured to facilitate framing for. In some embodiments, information about the window(s) and/or door(s) that the wall-opening framing interface strip is configured to facilitate framing for (via the visual framing location indications or markings 18). For example, the wall-opening framing interface strip may include window and/or door product number(s), sizes, models, etc. that the visual framing location indications or markings 18 are configured to be utilized to frame an opening therefor.

The width W1 of the wall-opening framing interface strip may be configured to be less than that of the interface strip 10 described above. For example, as the interface strip 10 may provide the necessary dampening and/or sealing according to the present disclosure, the width W1 of the wall-opening framing interface strip may be configured such that it only extends over the thickness or front/back sides of the framing members 12A, 12B that are stacked together, as shown in FIG. 3 and described above. In such an embodiment, the width W1 of the wall-opening framing interface strip may be configured such that the engagement side surface of thereof extends over only the outer side surfaces of top and bottom plate framing members 12, 12B (and thus not a portion of the outer faces of the top and bottom plate framing members 12A, 12B). In this way, when framing a wall via an interface strip 10 and opening in the wall via the wall-opening framing interface strip with the top and bottom plate framing members 12, 12B, the wall-opening framing interface strip may only present (and exposed) at the inside or outside of the top and bottom plate framing members 12, 12B (and thus the wall structure). In some embodiments, width W1 of the wall-opening framing interface strip may be 3 inches.

As described above, the visual marking of the interface strip 10 disclosed herein may correspond to locations of framing members as indicated in architectural construction drawings or plans of structural framing of a building structure (e.g., contained in CAD drawing files or other digital or digitized drawings of structural framing of a building structure). In some such embodiments the markings may be printed or otherwise provided on the interface strip 10 via an automated system that utilizes or references an architectural design drawing of a structure (e.g., a wall or floor of a building). The architectural design drawing may be generated using a Computer Aided Design System (CAD) or other digital or computer-based drawing software, for example. The computer-based drawing software and/or the automated system may convert the architectural design drawing into a digital drawing data file. The digital drawing data file may be sent to an input and/or processing system, such a computer. The computer may or may not include a display system for displaying information transmitted from the computer. The computer may include any suitable device, for example, a keyboard or mouse, for enabling an operator to send commands to the computer. The display system and the keyboard may be included in a workstation.

The architectural design drawing may include component information of a component indicated in the drawing, such as information related to a structural member, a window, a door, an electrical element, a plumbing element, and/or a heating, ventilation, air conditioning element, for example. In some embodiments, the structural member may include a wooden member, a metallic member, or other building material of the structure. In some embodiments, the window information, door information and other component information may include not only the specific location of the component, but also a particular component identification such as a vendor part or call out number, or actual rough opening dimensional measurements. Vendor part numbers may be used to access a database of vendor part specifications in order to determine the dimensions of components, for example.

The architectural design drawing may include a architectural drawing, such as a blueprint. The architectural drawing may be fed through a scanning system. The scanning system may generate a digital drawing data file that is transmitted to the input and processing system, for example.

The architectural design drawing may include Uniform Building Code (UBC) or International Residential Code (IRC) or other building code data. The UBC data may contain local building code standards that a structure must meet, such as a structural framing member thickness dimensions and spacings, for example. In some embodiments, the architectural design drawing may include a building site area code number or other job site location metric which can be used to identify and access particular region engineering specifications for the structure. Such specifications may be stored in a data base associated with the input and/or processing system, for example.

In some embodiments, the input and/or processing system may analyze the component information, the digital drawing data file, and the code data (if provided) and calculate and generate a dimensional location for each of the components (e.g., each structural framing member/stud, window, door, electrical element, plumbing element, heating, ventilation, air conditioning element, etc.) within the structure. The dimensional location of each component may be digitized and automatically transferred to an output system.

In some embodiments, the output system may send the digitized dimensional location of each component to a network. The network may be, e.g., an internet connection, a computer network, etc. The output system and/or network may transmit digitized dimensional location information for each component to a remote computer system. The remote computer system may be used to print or otherwise form the markings on the interface strip 10. Additionally, in some embodiments, the output system may store the digitized location for each component on any suitable digital storage media/memory (e.g., hard disk, CD, cloud, etc.).

In some embodiments, the output system may comprise a printing system or transit/transfer the digitized dimensional location of each component to a printing system. As described above, the markings indicate/show the location for each component of the structure on the interface strip 10. As described above, the markings may be uniformly spaced (for example, at 16 inch or 24 inch intervals to indicate stud spacing) and/or color and/or symbol coded to indicate a particular spacing or a component type (such as black for a structural member, red for an electrical element, blue for a plumbing element, and green for a heating, ventilation, and air conditioning element, for example). Identification numbers (e.g., vendor part numbers) may also be printed on the interface strip 10 adjacent to the location of the component, such as a window or a door. Dimensional data for a structural member length and/or size (e.g., thickness and width) may also be printed on the interface strip 10. The dimensional data may be printed in any suitable standard (e.g., English, Metric, etc.). One or more different types of the markings may be pre-printed on the outer material forming the interface strip 10 (e.g., by the manufacture of the sheet material of the material, by other manufacturers, or by a printing company, etc.) prior to the interface strip 10 being printed by the printing system. For example, indicia, such as uniformly spaced lines arranged 16 inches or 24 inches on center, may be pre-printed on the sheet material forming the interface strip 10. As described above, the interface strip 10 may be sized to overlay a one or a plurality of framing members.

In some embodiments, the printing system may print a listing of components. For example, the listing of components may comprise all of the components in a structure, are all of the components for each interface strip 10 within the structure. In some embodiments, the printing system may print a schematic plan view of the interface strip 10 locations within the structure.

In some embodiments, the system and method of making the interface strip 10 may utilize or reference another pre-existing or pre-designed second interface strip that is configured to be utilized with a single framing member (e.g., a bottom plate or a top plate), rather than with a pair of framing members (e.g., a bottom plate and a top plate) as shown in FIGS. 1-4 and described above.

In such embodiments, the system and method may include obtaining a digital file (e.g., image file) of a second interface strip that includes a plurality of second visual framing location indications that are spaced along a length of the second interface strip and is void of a visual alignment indication extending along the length of the second interface strip and is positioned in a medial portion of a width of the second interface strip. The digital file can be a photograph, screenshot, CAD file, or any other digital file containing data/information regarding the physical configuration (size, shape, etc.) of the second interface strip and/or the physical configuration (e.g., spacing, color, size, shape, etc.) of the second visual framing location indications thereof. In some embodiments, the digital file may contain an image of the second interface strip and/or the second visual framing location indications.

The system and method may utilize the digital file to form (e.g., print) the visual framing location indications of the interface strip 10 such that their spacings/locations along the length of the interface strip 10 correspond or match that of the second visual framing location indications of the second interface strip. For example, the system and method may determine the visual framing location indications 18 of the interface strip 10 and/or their spacing/locations along the length of the second interface strip, and created a printable file of the interface strip 10 with the visual framing location indications 18 thereof corresponding or matching the spacing/locations of the second visual framing location indications.

In some embodiments, the system and method may duplicate a digital file (e.g., image file) of the second visual framing location indications of the second interface strip and/or digital visual framing location indications corresponding to the second visual framing location indications on opposing sides of the visual alignment and/or separation indication 20 of the interface strip 10. For example, a digital image of the second interface strip and/or the second visual framing location indications thereof may be duplicated and arranged (e.g., in a mirrored relationship) along a width direction of the strip, and the visual alignment and/or separation indication 20 may be created such that it extends along or is aligned with the interface or junction of the duplicated images (e.g., extend along or aligned with the plane or axis of the mirrored arrangement). In these ways, for example, the system and method may utilize a digital file including a design of a second interface strip with second visual framing location indications configured for use with a single framing member (e.g., a top plate or a bottom plate) and recreate the second visual framing location indications on opposing sides of a visual alignment and/or separation indication 20 (e.g., a centerline) of the interface strip 10 that is configured to be used with a pair of framing members (e.g., the top and bottom plates).

The interface strip image file with the visual alignment and/or separation indication 20 and the visual framing location indications 18 corresponding to the second visual framing location indications of the second interface strip may be scaled to a 1:1 ratio with respect to the second interface strip. The interface strip image file (e.g., at least the visual framing location indications 18) may then be printed on an interface strip 10, such as an interface strip 10 disclosed herein.

In some embodiments, the method and system of making an interface strip 10 (and thus an interface strip 10 made thereby) may include forming (e.g., printing) framing member information on an outer face of an interface strip 10. In some such embodiments, an interface strip 10 corresponding to a wall structure that is to include an opening therein (e.g., a door, window or other rough opening), and such an interface strip 10 may include information relating to the particular framing members that form or are otherwise associated with the opening. For example, such an interface strip 10 may include a listing of framing members that form or are otherwise associated with the opening (e.g., sills, jack studs, headers, etc.), and indication of each of their lengths, printed or otherwise provided on an outer face thereof. In some embodiments, the identification of the opening-associated framing members and/or the information related thereto (e.g., lengths) provide on an outer face of the interface strip 10 may be input into the system/method by a user, or the system/method may extract the data from a digital drawing file or other digital source, for example. In some embodiments, the system/method may also print or otherwise output the identification of the opening-associated framing members and/or the information related thereto onto a separate and distinct medium (e.g., paper) (e.g., as a cut and/or reference list) as compared to an interface strip 10. In some embodiments, the system/method may also print or otherwise output a schematic plan illustrating wall structures corresponding to interface strip 10, framing members thereof (e.g., standard and/or opening-associated framing members) and/or information related thereto onto a separate and distinct medium (e.g., paper) as compared to an interface strip 10.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as referee labels, and are not intended to impose numerical, structural or other requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function cavity of further structure. It is to be understood that not necessarily all such objects or advantages described above may be achieved in accordance with any particular example. Thus, for example, those skilled in the art will recognize that the devices, systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosure are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A method of making an interface strip, comprising:

digitally obtaining structural framing information for a building structure from a digital architectural construction drawing, the structural framing information including framing information for at least one wall or floor assembly that comprises a first plate framing member, a second plate framing member and a plurality of support framing members extending between framing member faces of the first and second plate framing members at particular locations along lengths of the first and second plate framing members, and producing a digital layout of an interface strip from the structural framing information that is configured to overly at least a portion of outer faces of the first and second plate framing members that oppose the respective framing member faces of the first and second plate framing members and inner sides of the first and second plate framing members that respectively extend between the outer faces and the framing members faces of the first and second plate framing members when the first and second plate framing members are longitudinally aligned and stacked on one another with the framing member faces abutting, and comprises a plurality of spaced visual framing location indications along a longitudinal length of the interface strip that correspond to the locations of the support framing members along lengths of the first and second plate framing members of the at least one wall or floor assembly, wherein each visual framing location indication extends across at least a portion of a width of the interface strip and includes a portion that is positioned over the inner side surfaces of the first and second plate framing members when the interface strip overlies the aligned and stacked first and second plate framing members.

2. The method according to claim 1, wherein digitally obtaining structural framing information for a building structure from a digital architectural construction drawing comprises digitally obtaining structural framing information for the building structure from computer aided design software.

3. The method according to claim 2, wherein the computer aided design software produces the digital layout of the interface strip.

4. The method according to claim 1, wherein digitally obtaining structural framing information for a building structure from a digital architectural construction drawing comprises obtaining a digital image of an interface strip configured to extend over at least a portion of the outer face and the inner side of only one of the first and second plate framing members.

5. The method according to claim 1, wherein digitally obtaining structural framing information for a building structure from a digital architectural construction drawing comprises obtaining a digital image of a layout of an intermediary interface strip configured to extend over at least a portion of the outer face and the inner side of only one of the first and second plate framing members.

6. The method according to claim 5, wherein obtaining the digital image of the layout of the intermediary interface strip comprises digitally obtaining the digital image of the layout of the intermediary interface strip from computer aided design software.

7. The method according to claim 5, wherein producing the digital layout of the interface strip comprises mirroring the digital image of the layout of the intermediary interface strip across its width.

8. The method according to claim 1, further comprising scaling the digital layout of the interface strip to an actual size the at least one wall or floor assembly.

9. The method according to claim 1, further comprising printing the plurality of spaced visual framing location indications of the digital layout of the interface strip on an outer face of a physical interface strip.

10. The method according to claim 9, wherein the physical interface strip comprises:

at least one thin, elongate pliable and malleable layer; and at least one thin, elongate compressible and resilient outer layer extending over at least one face of the at least one pliable and malleable layer, wherein the at least one pliable and malleable layer is configured to maintain a three-dimensional shape of the interface strip, and wherein the outer face of the interface strip is formed by the at least one outer layer.

11. The method according to claim 10, wherein the at least one thin, elongate resilient and compressible outer layer comprises a first thin, elongate resilient and compressible outer layer portion extending over an outer face of the at least one pliable and malleable layer, and a second thin, elongate resilient and compressible outer layer portion extending over an inner face of the at least one pliable and malleable layer, wherein the first thin, elongate resilient and compressible outer layer portion defines the outer face of the interface strip and the second thin, elongate resilient and compressible outer layer portion defines an engagement side surface of the interface strip.

12. The method according to claim 9, wherein the digital layout of the interface strip further comprises a reference of the at least one wall or floor assembly of the building structure, and the printing further comprises printing the reference on the outer face of the physical interface strip.

13. The method according to claim 1, wherein method comprises producing a plurality of digital layouts of interface strips from the structural framing information that cooperatively correspond to the at least one wall or floor assembly.

14. The method according to claim 1, wherein the structural framing information includes framing information for a plurality of wall or floor assemblies of the building structure, and wherein the method comprises producing a plurality of digital layouts of interface strips from the structural framing information corresponding to the plurality of wall or floor assemblies.

15. The method according to claim 1, wherein the plurality of spaced visual framing location indications each extend across a medial portion of the width of the interface strip.

16. The method according to claim 1, wherein the digital layout of an interface strip further comprises a plate alignment visual indication that extends along at least a portion of the length of the interface strip and is positioned at a medial portion of the width of the interface strip.

17. The method according to claim 16, wherein each of the plurality of spaced visual framing location indications include portions positioned on opposing sides of the plate alignment visual indication along the width of the interface strip.

18. The method according to claim 17, wherein the portions of the visual framing location indications positioned on opposing sides of the plate alignment visual indication along the width of the interface strip comprise mirror image visual indications that are mirrored across the plate alignment visual indication.

19. The method according to claim 1, wherein the plurality of spaced visual framing location indications comprise a plurality interior indications that each define a length that extends along the length of the interface strip that is equal to a thickness of corresponding support framing members.

20. The method according to claim 19, wherein the plurality of spaced visual framing location indications further comprise a first end indication and a second end indication positioned at opposing end portions of the length of the interface strip, the first and second end indications each define a length that extends along the length of the interface strip that is half of the thickness of the support framing members.

* * * * *